United States Patent
Vincent et al.

(10) Patent No.: US 7,846,500 B2
(45) Date of Patent: Dec. 7, 2010

(54) LATEX-BASED OVERCOAT FOR INK-JET PRINTING APPLICATIONS

(75) Inventors: Kent Vincent, Cupertino, CA (US); Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 114 days.

(21) Appl. No.: 11/895,868

(22) Filed: Aug. 27, 2007

(65) Prior Publication Data

US 2007/0298165 A1 Dec. 27, 2007

Related U.S. Application Data

(62) Division of application No. 10/404,260, filed on Mar. 31, 2003.

(51) Int. Cl.
*B05D 5/00* (2006.01)
(52) U.S. Cl. ........................ 427/261; 427/288
(58) Field of Classification Search ............... 427/288, 427/261, 265, 466, 469; 335/340, 347
See application file for complete search history.

(56) References Cited

U.S. PATENT DOCUMENTS

| | | | |
|---|---|---|---|
| 4,497,917 A | 2/1985 | Upson et al. | |
| 4,613,633 A | 9/1986 | Sekiya et al. | |
| 4,808,443 A | 2/1989 | Minamoto et al. | |
| 4,916,171 A | 4/1990 | Brown et al. | |
| 5,281,261 A * | 1/1994 | Lin | 106/31.65 |
| 5,554,739 A | 9/1996 | Belmont | |
| 5,814,685 A | 9/1998 | Satake et al. | |
| 5,922,118 A | 7/1999 | Johnson et al. | |
| 5,990,202 A | 11/1999 | Nguyen et al. | |
| 6,057,384 A | 5/2000 | Nguyen et al. | |
| 6,248,805 B1 | 6/2001 | Nguyen et al. | |
| 6,352,805 B1 | 3/2002 | Taylor et al. | |
| 6,417,249 B1 | 7/2002 | Nguyen et al. | |
| 6,439,708 B1 | 8/2002 | Kato et al. | |
| 6,532,805 B1 | 3/2003 | Kokawa et al. | |
| 6,541,590 B1 * | 4/2003 | Johnson et al. | 526/281 |
| 6,548,571 B1 * | 4/2003 | Cheng et al. | 523/160 |
| 6,723,784 B2 | 4/2004 | Ito et al. | |
| 6,770,336 B2 | 8/2004 | Wang et al. | |
| 6,995,206 B2 * | 2/2006 | Zhou et al. | 524/514 |
| 2003/0112310 A1 | 6/2003 | Wang et al. | |
| 2003/0119973 A1 | 6/2003 | Ungefug | |
| 2003/0189626 A1 | 10/2003 | Kataoka et al. | |
| 2003/0224157 A1 | 12/2003 | Matthews et al. | |
| 2004/0030001 A1 | 2/2004 | Ma et al. | |
| 2004/0112525 A1 | 6/2004 | Pereira et al. | |
| 2004/0157957 A1 | 8/2004 | Ganapathiappan et al. | |
| 2004/0202838 A1 | 10/2004 | Uerz et al. | |

FOREIGN PATENT DOCUMENTS

| | | |
|---|---|---|
| EP | 107378 | 2/1984 |
| EP | 1145865 | 10/2001 |
| EP | 1201720 | 5/2002 |
| EP | 1321807 | 6/2003 |
| JP | 02080279 | 3/1990 |

OTHER PUBLICATIONS

Brandrup, J., Immergut EH, and Grulke, EA; Polymer Handbook 4th Ed., John Wiley & Sons, New York 1999 (pp. III/10 and III/34).
Brandrup, J., Immergut, EH, and Grulke, EA; Polymer Handbook 4th Ed., John Wiley & Sons, New York, 1999 (p. III-14).
Knovel Critical Tables [online] Knovel, Norwich, New York, 2003 [retrieved on Nov. 22, 2006]. Retrived from the Internet; <URL:http://www.knovel.com/knovel2/Toc.jsp?BookID=761.
Brandrup, J., Immergut, EH, and Grulke, EA; Polymer Handbook 4th Ed., John Wiley & Sons, New York 1999 (pp. III-8, III-12, III-16, III-24).

* cited by examiner

*Primary Examiner*—William Phillip Fletcher, III

(57) ABSTRACT

Compositions, systems, and methods for protecting an ink-jet produced image printed on a substrate are provided. The composition can comprise a liquid vehicle and latex particulates dispersed in the liquid vehicle, wherein the latex particulates have a surface dielectric constant from 2.0 to 3.0 at room temperature, and a bulk density from 0.90 g/cm$^3$ to 1.10 g/cm$^3$. An alternative composition can comprise a liquid vehicle and latex particulates dispersed in the liquid vehicle, wherein the latex particulates have a reactive surfactant covalently attached thereto.

10 Claims, No Drawings

LATEX-BASED OVERCOAT FOR INK-JET PRINTING APPLICATIONS

The present application is a divisional of U.S. patent application Ser. No. 10/404,260, filed on Mar. 31, 2003, which is incorporated herein by reference in its entirety.

FIELD OF THE INVENTION

The present invention relates generally to the ink-jet printing of durable images. More particularly, the present invention relates to a latex coating composition that can be used to overcoat ink-jet printed images.

BACKGROUND OF THE INVENTION

Computer printer technology has evolved to a point where very high-resolution images can be transferred to various types of media, including paper. One particular type of printing involves the placement of small drops of a fluid ink onto a media surface in response to a digital signal. Typically, the fluid ink is placed or jetted onto the surface without physical contact between the printing device and the surface. Within this general technique, the specific method that the ink-jet ink is deposited onto the printing surface varies from system to system, and can include continuous ink deposit and drop-on-demand.

With regard to continuous printing systems, inks used are typically based on solvents such as methyl ethyl ketone and ethanol. Essentially, continuous printing systems function as a stream of ink droplets that are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and solvents such as glycols. Essentially, with these systems, ink droplets are propelled from a nozzle by heat or by a pressure wave such that all of the ink droplets ejected are used to form the printed image.

There are several reasons that ink-jet printing has become a popular way of recording images on various media surfaces, particularly paper. Some of these reasons include low printer noise, capability of high-speed recording, and capability of multi-color recording. Additionally, these advantages can be obtained at a relatively low price to consumers.

Though there has been great improvement in ink-jet printing technology, as described previously, there is still improvement that can be made in many areas. With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks have low viscosity (typically 5 cps or less) to accommodate high frequency jetting and firing chamber refill processes common to ink-jet pens.

Ink-jet prints are often known for poor durability when exposed to water or high humidity. This results from the use of water-soluble and water dispersible colorants within the water-based ink. There has been great improvement in the area of water durability of ink-jet inks through incorporation of certain ink-jet compatible latex polymers. When printed as part of an ink-jet ink, a latex component of the ink can form a film on a media surface, entrapping and protecting at least some of the colorant within the hydrophobic print film. However, not all colorant will necessarily be protected upon printing, as would be optimal.

Polymers that form durable films are typically made from copolymers having bulk densities on the order of 1.15 g/cm$^3$ or greater, which is appreciably greater than water, the primary component of thermal ink-jet ink. As such, conventional latex particles are normally designed to flocculate so that latex precipitate may be easily shaken or stirred back into dispersion without agglomeration. Such flocculation behavior is well known with latex paints. Unfortunately, these conventional teachings do not address the unique needs of ink-jet printing applications. For example, the micro-channel ink feeds in ink-jet pens are easily clogged with precipitant, particularly when a pen is stored or otherwise unused for prolonged periods of time. Such precipitation is not easily redispersed by pen shaking, as flow constriction prohibits adequate mixing within micro-channels of pen architecture. Additionally, micro-channels used for jetting can house some of the ink over prolonged periods in preparation for firing, and settled latex particulates can cause further constricting of the micro-channels. This can result in ink-jet pen failure due to clogging of the micro-channels. Further, the micron-order settling distances found in the fluid channels of thermal inkjet pens exacerbate the problem.

SUMMARY OF THE INVENTION

It has been recognized that it would be advantageous to develop a latex-based overcoat for ink-jet printing applications. Such latex-based overcoats can be applied as a protective coating to dye-based and/or pigment-based ink-jet ink produced images.

Specifically, a composition for protecting an ink-jet produced image printed on a substrate can comprise a liquid vehicle void of colorant and having latex particulates dispersed in the liquid vehicle. The latex particulates can have a surface dielectric constant from 2.0 to 3.0 at room temperature, and a bulk density from 0.90 g/cm$^3$ to 1.10 g/cm$^3$. Additionally, in one embodiment, non-reactive surfactant can be adsorbed on the surface of the latex particulates.

Alternatively, a composition for protecting an ink-jet produced image printed on a substrate can comprise a liquid vehicle void of colorant and having latex particulates dispersed in the liquid vehicle, wherein the latex particulates have a reactive surfactant covalently attached thereto.

Additionally, a system for producing waterfast and humidfast images can comprise a media substrate, an ink-jet ink including a colorant, and a coating composition. The ink-jet ink can be configured for being printed on the media substrate. Further, the coating composition can include latex particulates dispersed in a liquid vehicle. The coating composition can also be configured for overcoating the ink-jet ink on the media substrate. Further, the latex particulates can have surfactant associated with the surface of the latex particulates.

A method for producing waterfast and humidfast images is also disclosed which can comprise steps of jetting an ink-jet ink including a colorant onto a media substrate and jetting a coating composition including latex particulates dispersed in a liquid vehicle over the ink-jet ink previously jetted on the media substrate. The latex particulates can have surfactant associated the surface of the latex particulates.

Additional features and advantages of the invention will be apparent from the detailed description that follows which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" or "ink vehicle" refers to the fluid in which colorants and/or latex particulates are added to form solutions and/or solutions. Many liquid vehicles, as well as specific vehicle components that can be used to formulate the liquid vehicles, are known in the art. Typical ink vehicles can include a mixture of a variety of different agents, such as co-solvents, surfactants, buffers, biocides, sequestering agents, viscosity modifiers, and water.

"Colorant" can include dyes and/or pigments that may be used to impart color to an ink vehicle in accordance with embodiments of the present invention. In accordance with the present invention, colorant is typically used in ink-jet inks to be overcoated by the latex particulate-containing coating compositions of the present invention. This in not to say that the latex can not be present in the colorant-containing ink-jet ink as well.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or subranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

As used herein, "effective amount" refers to at least the minimal amount of a substance or agent, which is sufficient to achieve a desire effect. For example, an effective amount of a "liquid vehicle" is at least the minimum amount required in order to create an ink composition, while maintaining properties necessary for effective ink-jetting.

The term "freqcel" denotes a reduction in ink drop ejection velocity with increased pen firing frequency. The lowering of drop velocity can be a problem as changes in the trajectory of the fired drops can reduce drop placement accuracy on the print media. Without being bound by one particular theory, freqcel may be attributable to thermal shear stripping of surfactant from latex near a pen firing chamber at the time of drop nucleation. As surfactant is typically present in ink-jet inks to help separate particles, a reduction in surface-adsorbed or surface-attracted surfactant can promote greater inter-particle attraction. This can result in increased ink viscosity. Greater pen firing energy can be used to counteract this phenomenon, but bubble entrapment can be exacerbated at these higher viscosities, which is known to worsen freqcel performance.

The term "decel" denotes an increase in ink flow resistance within pen micro-channels, which in turn, reduces ejected drop volume. Such flow resistance can be caused by changes in ink rheology or plugged channels, and is often responsible for ink starvation within a pen firing chamber.

The term "decap" is a measure of how long a nozzle may remain inactive before plugging and how many pen firings are required to re-establish proper drop ejection.

The terms "surface dielectric constant" and "bulk dielectric constant" as well as the terms "bulk density" and "glass transition temperature" require a detailed explanation. Table 1 below provides, by way of example, certain homopolymers values for homopolymers that can be used to predict bulk or surface dielectric constants, bulk densities, and glass transition temperatures of latex copolymers in accordance with principles of the present invention. Such predictions can be made in accordance with accepted Bicerano correlations, reported in *Predictions of Polymer Properties*, Bicerano, Jozef, Marcel Dekker, Inc., New York, N.Y., 1996. Table 1 should not be construed as including all homopolymers that can be used to make latex in accordance with principles of the present invention. Additionally, not all of the homopolymers listed in Table 1 are effective for use in making the latex particulates in accordance with principles of the present invention. Table 1 is merely provided to teach what is meant by the terms "surface dielectric constant" or "bulk dielectric constant" as well as the terms "bulk density" and "glass transition temperature."

TABLE 1

Homopolymer values

| Monomer | W | $E_{coh1}$ | $V_w$ | $N_{dc}$ | $\epsilon$ | V | $\rho$ | $T_g$ |
|---|---|---|---|---|---|---|---|---|
| n-octyl methacrylate | 198.31 | 69686 | 127.08 | 24 | 2.45 | 204.2 | 0.971 | −20 |
| Styrene | 104.15 | 39197 | 64.04 | 10 | 2.55 | 99.1 | 1.050 | 99.9 |
| cyclohexyl methacrylate | 168.24 | 59978 | 99.86 | 24 | 2.58 | 153.2 | 1.098 | 103.9 |
| 2-ethylbutyl methacrylate | — | 59130 | 107.28 | 24 | 2.68 | 163.7 | 1.040 | 11 |
| hexyl methacrylate | 170.23 | 59804 | 106.70 | 24 | 2.69 | 168.5 | 1.010 | −5.2 |
| isobutyl methacrylate | 142.20 | 48496 | 85.60 | 224 | 2.70 | 136.1 | 1.045 | 47.9 |
| t-butyl methacrylate | 142.20 | 46427 | 84.94 | 24 | 2.73 | 139.4 | 1.020 | 107 |

TABLE 1-continued

Homopolymer values

| Monomer | W | $E_{coh1}$ | $V_w$ | $N_{dc}$ | $\epsilon$ | V | $\rho$ | $T_g$ |
|---|---|---|---|---|---|---|---|---|
| sec-butyl methacrylate | 142.20 | 48872 | 86.92 | 24 | 2.75 | 135.2 | 1.052 | 57 |
| 2-ethylhexyl methacrylate | 198.31 | 77980 | 127.65 | 24 | 2.75 | 202.2 | 1.020 | 5.2 |
| n-butyl methacryalte | 142.20 | 49921 | 86.33 | 24 | 2.77 | 134.8 | 1.055 | 20 |
| n-butyl acrylate | 128.17 | 46502 | 76.82 | 24 | 2.87 | — | — | −54 |
| benzyl methacryalte | 176.22 | 64919 | 98.40 | 24 | 2.90 | 149.4 | 1.179 | — |
| hexyl acrylate | 156.23 | 65352 | 98.56 | 24 | 2.91 | 151.6 | 1.030 | −57.2 |
| ethyl methacrylate | 114.15 | 40039 | 65.96 | 24 | 3.00 | 102.0 | 1.119 | 50.9 |
| methyl methacrylate | 100.12 | 35097 | 54.27 | 24 | 3.10 | 85.6 | 1.170 | 104.9 |
| methyl acrylate | 86.09 | 31678 | 44.76 | 24 | 3.28 | 70.6 | 1.220 | 8 |
| ethylene glycol dimethacrylate | 198.22 | 88978 | 111.69 | 48 | 3.35 | 169.88 | 1.169 | — |
| methacrylic acid | 86.09 | 38748 | 45.99 | 24 | 3.52 | 70.6 | 1.219 | 187 |
| hydroxyethyl methacrylate | 130.14 | 66502 | 69.44 | 36 | 3.74 | — | — | 86 |
| methacryloyl-oxyethyl succinate | 230.22 | 111243 | 116.06 | 72 | 3.84 | 177.4 | 1.298 | 58.3 |
| acrylic acid | 72.06 | 35329 | 36.48 | 24 | 3.90 | 53.5 | 1.347 | 106 |

In Table 1 above, the abbreviations used are defined as follows:
W Monomer molecular weight (grams/mole)
$E_{coh1}$ Cohesive energy (joules/mole)
$V_w$ Van der Waals volume (cm$^3$/mole)
$N_{dc}$ Fitting parameter (cm$^3$/mole)
$\epsilon$ Dielectric constant (no units)
V Molar volume (cm$^3$/mole)
$\rho$ Density (grams/cm$^3$)
$T_g$ Glass transition temperature (Celsius)

From these values, the bulk or surface dielectric constant, bulk density, and glass transition temperature of latex copolymers formed by copolymerization of any combination of these monomers (or other known monomers where these values are available) may be predicted using the following Bicerano correlations and glass transition temperature relationships:

$$\text{Dielectric constant } (\in) = 1.412014 + (0.001887 E_{coh1} + N_{dc})/V_w \quad \text{Formula 1}$$

$$\rho = W/V \quad \text{Formula 2}$$

$$[1/T_g]_{copolymer} = \Sigma(w/T_g)_n \quad \text{Formula 3}$$

In the above Formulas 1 and 2, $\in$ and $\rho$ are the latex bulk or surface dielectric constant and bulk density, respectively. The terms $E_{coh1}$, $N_{dc}$, $V_w$, W, and V are the molar fraction sum of the homopolymer cohesive energies, fitting parameters, van der Waals volumes, molecular weights, and molar volumes, respectively. The inverse latex glass transition temperature, $[1/T_g]_{copolymer}$, which is computed in Kelvin as provided in Formula 3, is the sum (n) of the ratio of weight fraction to homopolymer glass transition temperature of each monomer in the latex copolymer.

With respect to latex that is polymerized or copolymerized to be roughly uniform throughout, the terms "bulk dielectric constant" and "surface dielectric constant" can be used interchangeably. For example, the bulk dielectric constant describes not only the core hydrophobicity, but also the surface hydrophobicity, as the core and the surface are, on average, of the same material. However, in embodiments where a core-shell, inverse core-shell, or composite latex is formed, the bulk dielectric constant will usually be different than the surface dielectric constant, as the core of the latex will be of a different polymer or copolymer than the shell. Thus, in core-shell, inverse core-shell, and composite embodiments, it is primarily the dielectric constant of the shell material, i.e., the surface dielectric constant, which plays a role in surfactant adsorption. As a result, when referring to dielectric constant values, surface dielectric constant values will be used, as the surface dielectric constant values account for both single material latex copolymers as well as core-shell, inverse core-shell, and composite latex copolymers.

Generally, the term "reactive surfactant" means any surfactant, e.g., surfmer, non-migratory surfactant, etc., that has the ability to fix itself onto the surface of a latex particulate, such as, for example, by formation of a covalent bond. Typically, the reactions between reactive surfactants and the latex particle surface are sufficiently strong to prevent separation and migration therebetween.

Generally, the term "non-reactive surfactant" includes surfactants that are adsorbed (as opposed to fixed, reacted, or bonded) onto the surface of the latex particle. During high-speed printing operations, non-reactive surfactants are typically desorbed or stripped off of the latex particle surface, unless the latex particle surface exhibits favorable conditions, such as a low dielectric constant. These surfactants can be adsorbed on the surface of the latex by matching, within a reasonable range, the surface delectric constant of the latex and the hydrophobic moiety of the surfactant.

The definition of reactive surfactant and non-reactive surfactant can be more fully appreciated with reference to the descriptions and examples contained hereafter.

The terms "latex-containing coating," "coating composition," "latex particulate-containing coating composition," and the like, includes substantially colorless compositions including a liquid vehicle having latex particulates dispersed therein. These compositions typically are void of colorant, and can be used to protect images printed by colorant-containing ink-jet inks. These coating compositions can include 0.1 wt % to 20 wt % latex particulate solids, dispersed in a liquid vehicle. In one embodiment, the solids can be present in the liquid vehicle at from 4 wt % to 12 wt %.

With this in mind, it has been recognized that it would be advantageous to develop compositions, systems, and methods for printing waterfast and humidfast images. Specifically, latex particulate-containing coating compositions can be used to overcoat dye- and pigment-based ink-jet ink produced images.

In accordance with an embodiment of the present invention, a composition for protecting an ink-jet produced image printed on a substrate can comprise a liquid vehicle void of colorant and latex particulates dispersed in the liquid vehicle. The latex particulates can have a surface dielectric constant from 2.0 to 3.0 at room temperature, and a bulk density from 0.90 g/cm$^3$ to 1.10 g/cm$^3$.

Alternatively, a composition for protecting an ink-jet produced image printed on a substrate can comprise a liquid vehicle void of colorant and latex particulates dispersed in the liquid vehicle, wherein the latex particulates have a reactive surfactant covalently attached thereto.

Additionally, a system for producing waterfast and humidfast images can comprise a media substrate, an ink-jet ink including a colorant, and a coating composition. The ink-jet ink can be configured for being printed on the media substrate. The coating composition can include latex particulates dispersed in a liquid vehicle, and can also be configured for overcoating the ink-jet ink on the media substrate. Further, the latex particulates can have surfactant associated with the surface of the latex particuates.

A method for producing waterfast and humidfast images can comprise steps of jetting an ink-jet ink including a colorant onto a media substrate, and jetting a coating composition including latex particulates dispersed in a liquid vehicle over the ink-jet ink previously jetted on the media substrate. The latex particulates can have surfactant associated with the surface of the latex particulates.

As stated, the compositions for protecting ink-jet produced images (or coating compositions) described herein include a liquid vehicle and a dispersion of latex particulates. These coating compositions can be overcoated on dye- and/or pigment-based ink-jet ink produced images to form a coating lattice or protective film that is typically clear, or substantially colorless. Print films developed through incorporation of colorant with latex in a common vehicle do not typically provide substantially complete encapsulation of the colorant between the media substrate and the film, particularly when the colorant is a dye. A fraction of the colorant can invariably lie on top of or may only be partially trapped by the latex. The use of a latex overcoat can provide a definitive barrier between the colorant and the environment, moisture, and/or smearing agents.

A latex overcoat can provide still further advantages. For example, an overcoat can include a greater solids content of latex a composition containing both a latex and a pigment (as both the pigment and the latex must be considered when determining a total solids amount in an ink-jet ink). This consideration is valuable as the respective coating and ink can be limited in solids content due to certain ink-jet imposed viscosity thresholds. The latex solids content of an ink-jet ink can thus be compromised by the content of pigment. As a result, by separating latex solids from pigment solids, more latex can be used in a liquid vehicle, thereby providing more latex since the total amount of solids does not have to include pigment solids amounts.

The latex of the present invention can be prepared through conventional free radical addition of a monomer mixture through emulsion polymerization. Suitable monomers are included in U.S. Pat. No. 6,057,384, which is incorporated herein in its entirety by reference. The latex can be dispersion stabilized through incorporation of a monomer or monomers that promote latex surface charge, including those represented by acrylic acid, methacrylic acid, vinyl benzoic acid, and methacryloyloxyethyl succinate. These charge forming monomers typically are present in the copolymer at from 0.5 wt % to 20 wt %. In another embodiment, the charge forming monomers can be present at from 3 wt % to 10 wt % of the monomer mix. These charge forming monomers can be neutralized after latex polymerization to form salts. In one embodiment, the salts can be formed through the reaction of a latex carboxylic acid with potassium hydroxide.

Particle dispersion stability is also influenced by particle density, which influences the ability of particles to settle within pen microchannels. In accordance with embodiments of the present invention, the latex can be generated or selected to have a bulk density of 0.90 g/cm$^3$ to 1.10 g/cm$^3$. In a more detailed embodiment, the bulk density can be from 1.02 g/cm$^3$ to 1.05 g/cm$^3$. This more narrow range results from the understanding that the liquid vehicle of many aqueous ink-jet inks has a density on the order of about 1.02 g/cm$^3$.

In a more detailed embodiment, the bulk density range provided can be modulated such that the bulk density is in a range slightly above or below the liquid component density of the predominantly water-based ink vehicle. By predominant, what is meant is that water is present in an amount that is greater than any other single vehicle component. Within a relatively narrow density band above or below this level, Brownian energy can prevent latex settling or floatation, respectively. As ink vehicle fluid densities of predominantly water-based ink-jet inks are typically about 1.02 g/cm$^3$, bulk densities of latex particulates that are approximately the same to slightly higher or lower can be included with little to no settling over a period of years. Thus, in this embodiment, in order to prevent latex particulate settling or floatation, the density can be kept in a range slightly higher or slightly lower than the density of an ink vehicle and within the range that Brownian momentum exchange is effective. The rate of settling can increase with the difference between the vehicle and latex densities. However, if the liquid vehicle is other than about 1.02 g/cm$^3$, bulk density ranges for latex particulates may be desirable for use that are other than those ranges previously enumerated.

One strategy that can be used to obtain appropriate bulk density is to utilize low-density latex polymers having incorporated therein at least one ring containing monomer. The ring containing monomer can improve the print film durability of the latex. In one embodiment, the latex according to this aspect of the invention, can contain a blend of alkane, e.g., hexyl methacrylate, and ring-based, e.g., styrene, monomers to adjust the thermal glass transition temperature for print film formation at a given temperature. The use of these or other similar polymers can provide the above-mentioned benefits without a reduction in print film durability.

The glass transition temperature of the polymer can fall in the range of about 0° C.<$T_g$<50° C. In an alternative embodiment, the glass transition temperature range can be from 10° C.<$T_g$<40° C. These temperature ranges can allow for room temperature film formation of an ink without process or pen induced particle agglomeration. Higher glass transition temperature ranges may be selected for use when latex coagulation is accomplished at a higher than ambient temperature, for example by heated fuser roller. When using a conjugated ring structure, the π-electrons of such ring structures can provide strong adhesive forces without the added density typical of more polar monomers. Additionally, a blend of alkane and ring-based monomers can be used to adjust the thermal glass transition temperature ($T_g$) of the latex copolymer for print film formation.

The latex can also be stabilized to protect from thermal shear degradation by the incorporation of a crosslinking agent or multimer, such as a dimer, into the copolymeric latex. For example, from 0.1 wt % to 5 wt % of such a multimer can be present in the latex particulates. Alternatively, from 1 wt % to 2 wt % of such a multimer can be used. These crosslinking agents are capable of forming crosslinks between polymer chains in the latex particle. Examples of appropriate crosslinking agents that can be used include ethylene glycol dimethacrylate, pentaerythritol tetraacrylate, ethyleneglycol dimethacrylamide, divinyl benzene, or other monomers with polymerizable di- or polyfunctional groups. This relatively narrow range of crosslinking can aid in maintaining the integrity of latex under the high thermal shear conditions that occur during thermal ink-jet printing, while not adversely impacting its room temperature film-forming properties.

Optionally, one or more ultraviolet absorber moieties can be included in the coating composition of the present invention. For example, an ultraviolet absorber can be dissolved or dispersed in the liquid vehicle containing the latex particulates, or alternatively, the ultraviolet absorber can be polymerized into the latex particulates. Appropriate ultraviolet absorbers can include blocking chromophore moieties, which can imparts lightfastness to the polymer. A more detailed description of UV absorbers can be found in U.S. Pat. No. 6,057,384, which was previously incorporated herein by reference. Separating a colorant-containing ink-jet ink from a latex-containing coating composition can also provide advantages with respect to embodiments utilizing this ultraviolet protection. For example, an overcoat can include ultraviolet absorbers that protect entrapped colorant from photo degradation. In general, it is not typically desirable to include ultraviolet absorbers in inks, as the close proximity of colorant and ultraviolet absorber can allow transfer of absorbed photon energy to the colorant, accelerating photo-degradation. Thus, the presence of an absorber in the ink, ironically, can increase the amount of photon energy that would otherwise be absorbed by the ink. By including these types of compositions in an overcoat, the ultraviolet absorbed and colorant can be separated in different print layers, thereby providing improved performance.

Copolymeric latexes having a surface dielectric constant from 2.0 to 3.0 can also provide acceptable properties. In one embodiment, the surface dielectric constant can be from 2.3 to 2.8. Such dielectric constant ranges for latex copolymers provide sufficient dielectric constant hydrophobicity to sufficiently anchor non-reactive surfactants (if present) to the latex, thereby protecting against substantial thermal shear stripping that can occur in thermal ink-jet printing applications. A latex surface dielectric constant as low as 2.0 can be achieved by incorporating monomers having a very low dielectric constant. Examples of such monomers include fluorosilicons or fluorocarbons. Alternatively, reactive surfactants can be covalently attached to the surface of the latex particulates. When this approach is followed, surface dielectric constant becomes less of a consideration, as thermal stripping is less likely to occur when reactive surfactant is covalently attached to the latex particulates.

Generally, the latex particles of the present invention can be prepared by mixing monomers together to form a monomer mixture. A polymerization step can also be carried out to form the particulates. Surfactant(s) can then be added to the monomer mixture and sheared to form an emulsion. The surfactant(s) can include a reactive surfactant, a non-reactive surfactant, or a combination of reactive and non-reactive surfactants. In one embodiment of the invention, non-reactive surfactants can be used to form the latex particle, and reactive surfactants can be used, either in concert or added in a second step. Alternatively, polymerization can be carried out as a soap-free polymerization, with a reactive surfactant being added near the end of polymerization.

As described, dielectric constant values can be used as a measure of hydrophobicity. Steric stabilizers, such as surfactants, can be used to control the latex particulate size during polymerization, and can also be selected to provide additional particle dispersion stability. Such stabilizers can be adhered to the particle surface to minimize thermal stripping under pen firing conditions. This phenomenon can be prevented by matching the hydrophobicity of the latex monomer set and the non-reactive surfactant. The hydrophobic segments of conventional surfactants typically comprise long branched or unbranched hydrocarbon chains, e.g., from 5 to 50 atoms in length, at a first end, and branched or unbranched long hydrophilic chains, e.g., from 5 to 100 atoms in length, at the other end. An example of such an unbranched surfactant is shown as Formula 4 below:

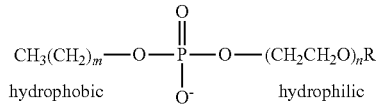

Formula 4 wherein m can be from 5 to 50, n can be from 5 to 100, and R can be H or $CH_3$. Formula 4 merely provides one exemplary surfactant that can be used. Other known surfactants can also be used. As shown, the hydrophobic moiety and the hydrophilic moiety can be bound together by an acid, such as a phosphoric acid. Such an acid can add charge to the surface of the latex, which compliments the charge that may already be present on the surface. Further, the hydrophilic moiety can add steric stabilization to the surface of the latex.

Hydrophobic moieties of the surfactant, if primarily aliphatic, typically are expected to have dielectric constants of about 2.3, as is nominal for polyolefins. Good adhesion of a hydrophobic moiety of a surfactant to the surface of a latex particulate can occur when the dielectric constants of the two are matched as closely as can be achieved. Departure from optimal adhesion is believed to be proportional to the dielectric constant difference between a hydrophobic moiety of the surfactant and the surface of the latex. As a result, it has been recognized that a narrow range of latex surface dielectric constants, as well as bulk densities, can be obtained by engineering latexes to meet these criterion. By obtaining one or both of these properties, if a non-reactive surfactant is desired to be adsorbed on the surface of the latex, adequate surfactant adhesion can be obtained to minimize or eliminate latex printability and dispersion related problems often associated with latex-containing ink-jet inks. Further, such formulations can prevent both latex floatation and settling within an aqueous-based ink vehicle. In other words, upon adhesion of the hydrophobic moiety of the surfactant to the surface of a latex particulate, the hydrophilic moiety can extend from the surface in a hair-like manner, providing properties to the hydrophobic latex particulate that makes it useable in a predominantly water-based ink-jet ink vehicle.

It is understood that the surface dielectric constant of a latex particle is of primary concern in situations where a non-reactive surfactant is being used to provide dispersion stability. Thus, in alternative embodiments of the invention, non-reactive surfactants having a dielectric constant closely matched to the dielectric constant of the latex particle can be used. Without being restricted to any particular theory, the adsorption between the hydrophobic segment of the non-reactive surfactant and the latex surface seems to improve as the dielectric constants are more closely matched, thus making the non-reactive surfactant less likely to strip off during jetting from a thermal ink-jet pen.

Similar to non-reactive surfactants, reactive surfactants are molecules that typically have a hydrophobic segment and an ionizable and/or polar segment or group. The hydrophobic segment preferentially absorbs onto the surface of the latex particle during and following particle polymerization. The hydrophilic segment extends into the normally aqueous solution phase and thereby provides a steric barrier against particle coagulation. Unlike their non-reactive counterparts, reactive surfactants additionally contain a reactive group on a hydrophobic segment that is capable of covalently bonding to the latex surface. In one embodiment of the present invention, the reactive group is of the same reactive species as that found in the latex monomer(s) so that the surfactant reacts more readily into the latex surface during the latex polymerization reaction. It is understood that the reactive surfactant may also bind to the latex surface through other and subsequent reaction means.

Suitable reactive surfactants for use with the present invention include any surfactants having a reactive group on the hydrophobic segment that are capable of covalently bonding to the surface of a latex particle. The length and composition of the hydrophobic segment of the reactive surfactant can be selected to substantially correspond to the surface chemistry and the rheological needs of the latex particle. One such representative hydrophobic segment is a $C_{10-20}$ alkyl chain. The hydrophilic group may be anionic, cationic, or non-ionic. Suitable anionic functional groups include, for example, sulfonate, phosphonate, and carboxylate ions. Suitable cationic functional groups include, for example, ammonium ions. Suitable non-ionic surfactants typically include surfactants exhibiting ethoxy group hydrophilicity.

The reactive group can be selected based on the reactive species of the latex monomer. For example, acrylate reactive groups could be selected as reactive groups for use with lattices that are polymerized via vinyl, acrylic and styrenic monomers. A representative reactive surfactant for such a reaction is MAXEMUL™ 6106 (available from Uniquema), which has both phosphonate ester and ethoxy hydrophilicity, a nominal $C_{18}$ alkyl chain with an acrylate reactive group. Other representative reactive surfactants with phosphate ester functionalities suitable for such reactions include, but are not limited to, MAXEMUL™ 6112, MAXEMUL™ 5011, MAXEMUL™ 5010 (all available from Uniquema). Alternative reactive surfactants suitable for use with various embodiments of the present invention include polyoxyethylene alkylphenyl ether ammonium sulfate (available from Montello, Inc. as HITENOL BC-10™, HITENOL BC-1025™, HITENOL BC-20™, HITENOL BC-2020™, HITENOL BC-30™), polyoxyethylene alkylphenyl ether (available from Montello, Inc. as NOIGEN RN-10™, NOIGEN RN-20™, NOIGEN RN-30™, NOIGEN RN-40™, and NOIGEN RN-5065™), sodium allyloxy hydroxypropyl sulfonate (available from Rhodia as SIPOMER COPS-1™), alkenenyl-functional nonionic surfmers, allyl methoxy triethylene glycol ether, sodium methallyl sulfonates, sulfopropyl acrylate, vinyl sulfonate, vinyl phosphate, monosodium ethylsulfonate monondodecyl maleate, sorbitol acrylate, sorbitol methacrylate, perfluoro heptoxy poly(propyloxy)methacrylate, phenoxyl poly(ethyleneoxy acrylate, phenoxyl poly(ethyleneoxy)methacrylate, nonyl phenoxy poly(ethyleneoxy)crotanate, nonyl phenoxy poly(ethyleneoxy)fumarate, nonyl phenoxy poly(ethyleneoxy)acrylate, nonyl phenoxy poly(ethyleneoxy)methacrylate, mono doecyl maleate, and allylsulfosuccinate derivatives (such as TREM LT-40™ (available from Henkel)). In particular embodiments of the invention, where applicable, the reactive surfactant will include 1 to 40 ethyleneoxy or propyloxy units.

In another embodiment, the latex particulates of the present invention can include a conventional core-shell or inverse core-shell latex structure, or composite latex. Such a composite latex can be prepared in accordance with principles of the present invention, wherein the shell layer incorporates a monomer mix in accordance with the properties described herein, e.g., surface charge monomer, multimer, dielectric constant specifications, etc. The shell layer, in this case, can provide thermal shear and dispersion stabilizing properties independent of the properties of the latex core. Additionally, the core and shell polymers collectively can be configured to produce a latex particle having a bulk density as defined previously with respect to non-composite polymeric or copolymeric latexes. As is known in the art, core-shell latexes can be prepared in a two-step process, where a first latex particle is synthesized and forms a seed for polymerization of shell monomers around the seed particle.

Whether using single copolymeric latex or a composite latex, as long as the latex is prepared in accordance with the principles described herein, problems associated with freqcel, decap, and decel can be substantially improved. For example, freqcel can be proportionately overcome by increased latex surface hydrophobicity. A latex that is principally comprised of a methyl methacrylate-hexyl acrylate copolymer, for example, can show freqcel at 3 kHz, while a significantly more hydrophobic styrene-hexyl methacrylate copolymer latex shows virtually no freqcel through 12 kHz. More hydrophobic latex, however, when stripped of its surfactant through dialysis, shows significant freqcel at 3 kHz, as observed with the less hydrophobic latex. Without being bound by any particular theory, the adhesion between the hydrophobic segment of non-reactive surfactant and the latex surface seems to improve as the dielectric constants are more closely matched, thus making the surfactant less likely to strip off during jetting from a thermal inkjet pen. Reactive surfactants, on the other hand, do not require such dielectric matching, as reactive surfactants are typically covalently bound to the surface of the latex.

A typical liquid vehicle formulation that can be used with the latexes described herein can include water, and optionally, one or more co-solvents present in total at from 0 wt % to 30 wt %, depending on the pen architecture. Further, one or more non-ionic, cationic, and/or anionic surfactant can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the ink vehicle is predominantly water.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the surfactant that is described as being usable in the ink vehicle is not the same as the surfactant that is described as being adhered to the surface of the latex, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

Colorant-containing ink-jet inks that can be overcoated with the latex compositions of the present invention include any ink-jet ink that is functional with a latex overcoating of the present invention. Examples of such inks or ink-sets include those available from Hewlett-Packard Company. Though ink-jet ink produced images can be overcoated with the compositions of the present invention, other printed images can also be coated, included laser printer produced images, offset ink printed images, silver halide photographic images, photo copier produced images, and the like.

The present latex-containing coating can be printed through a set of ink-jet nozzles that is separate from the nozzles used to print the colored ink-jet ink. The coating can be printed subsequent to the printing of the colored ink after any functional time interval. For example, depending on the application, it may be desirable to print the latex overcoating composition immediately after application of the colorant-containing ink-jet ink, and in other embodiments, it may be desirable to print the latex overcoating after several seconds or even minutes. The overcoat nozzles can be included in the same pen architecture as the ink-jet ink, or can be included in separate pen architecture. In one embodiment, a set of overcoat nozzles at both the leading end and the trailing end of the collective colored ink-jet nozzles can be used to allow for subsequent overcoat printing in a bi-directional traversing pen printer. Further, the overcoat can be printed at a higher drop weight than that of the colorant-containing ink-jet ink. Higher drop weight is generally provided by larger nozzle diameters, in addition to other pen geometry expansions. Higher drop weight can also allow for a printed overcoat print dot to spread beyond the boundary of the colored ink dot it protects with greater print film thickness. This technique can provide greater composite print film durability. Further, larger diameter nozzles generally allow printing with less vehicle co-solvent, further improving print film durability.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Various Latexes

Nine latex copolymers were prepared using the same procedure and total weight percents of monomers and additives, the only difference being the individual monomers and weight percent for each monomer selected. The monomer content for each copolymer is set forth in Table 2 below:

TABLE 2

Monomer content for each of nine copolymers prepared

| | Monomers (wt %) | | | | | | | | |
|---|---|---|---|---|---|---|---|---|---|
| Copolymer | MMA | Styrene | BMA | HMA | EHMA | HA | MES | MAA | EGDMA |
| 1 | 74 | | | | | 15 | 10 | | 1 |
| 2 | 58 | | | | | 31 | 10 | | 1 |
| 3 | 48 | | | | | 41 | 10 | | 1 |
| 4 | 41 | | | | | 48 | 10 | | 1 |
| 5 | | | 40 | | 49 | | 10 | | 1 |
| 6 | | | 20 | 69 | | | 10 | | 1 |

TABLE 2-continued

Monomer content for each of nine copolymers prepared

| Copolymer | Monomers (wt %) | | | | | | | | |
|---|---|---|---|---|---|---|---|---|---|
| | MMA | Styrene | BMA | HMA | EHMA | HA | MES | MAA | EGDMA |
| 7 | | | | 89 | | 10 | | | 1 |
| 8 | | 20 | | 59 | | 10 | | | 1 |
| 9 | | 20 | | 73 | | | | 6 | 1 |

In Table 1 above, the abbreviations are defined as follows:
MMA methyl methacrylate
BMA butyl methacrylate
HMA hexyl methacrylate
EHMA 2-ethylhexyl methacrylate
HA hexyl acrylate
MES methacrylolyoxy ethyl succinate
MAA methacrylic acid
EGDMA ethylene glycol dimethacrylate The procedure used to prepare each individual latex was as follows. A 200 gram monomer mix consisting of three or four monomers according to Table 2 was mixed into 70 ml of water. Each mixture was emulsified with Rhodafac RS710 surfactant in 14.6 g of water. The Rhodafac concentration for each copolymer preparation was varied from between 1.5 wt % to 2.5 wt % to maintain a collective particle size between 220 nm to 260 nm. A solution of potassium persulfate (1 g) in water (50 ml) was added dropwise to a reactor containing 90° C. preheated water (650 ml). The drop rate was adjusted to fully release the persulfate over a period of 24 minutes. Three minutes into the persulfate addition, the emulsion was dropwise added to the reactor over a period of 20 minutes. The reaction was maintained at 90° C. for 1.5 hour, and then cooled to room temperature. The nine respective latex polymers obtained were neutralized with potassium hydroxide solution to bring the pH of each latex solution to about 8.5. Each of the nine latex copolymers prepared were then filtered with a 200 mesh filter to particle sizes from about 220 to 260 nm.

Example 2

Performance of Latexes

The bulk or surface dielectric constant, bulk density, and glass transition temperature of latex copolymeric particulates of Example 1 can be predicted, provided certain information is known about the monomers used in the latex particulate. Specifically, by using the relationships described in Formulas 1-3 provided above, and the homopolymer values shown in Table 1, the nine latexes prepared in Example 1 were calculated to have the respective bulk or surface dielectric constants and bulk densities shown in Table 3 below. All of the latex copolymers prepared had a glass transition temperature that would be acceptable for use at room temperature. Table 3 below shows the results of tests conducted with respect to dispersion stability, freqcel, and printability, as follows:

TABLE 3

Bulk density and surface dielectric constant compred to dispersion stability, freqcel, and printability

| Copolymer | Bulk Density (g/cm$^3$) | Surface Dielectric Constant | Dispersion Stability | Freqcel | Printability |
|---|---|---|---|---|---|
| 1 | 1.16 | 3.12 | Poor | poor | poor |
| 2 | 1.13 | 3.09 | Poor | poor | poor |
| 3 | 1.12 | 3.07 | Poor | poor | poor |
| 4 | 1.11 | 3.06 | Poor | poor | poor |
| 5 | 1.04 | 2.86 | acceptable | acceptable | acceptable |
| 6 | 1.04 | 2.81 | acceptable | acceptable | acceptable |
| 7 | 1.04 | 2.80 | acceptable | acceptable | acceptable |
| 8 | 1.04 | 2.77 | acceptable | acceptable | acceptable |
| 9 | 1.03 | 2.72 | acceptable | acceptable | acceptable |

With respect to dispersion stability shown in Table 3 above, a portion of the latexes prepared in accordance with Example 1 were each diluted to 0.25 wt % solids in water, each dilution filling a standard test tube. The test tubes were placed vertical at rest in a standard test tube rack and monitored for particle layering and settling over an eight-month period. All latexes having a computed density of over 1.10 g/cm$^3$ showed particle precipitation within three weeks, the severity of layering was proportional to density. The latexes having densities less than 1.05 g/cm$^3$ showed no layering or settling over the eight-month period.

With respect to the freqcel and printabilty (decel and decap) observations provided in Table 3, each of the latexes prepared in accordance with Example 1 were incorporated into a standardized ink formulation and print tested for freqcel, decel, and decap using a Hewlett-Packard thermal ink-jet pen. Latexes having computed dielectric constant above 3.0 failed to print above 8 kHz drop frequency and showed poor printability as measured by decel and decap metrics. The severity of freqcel, decel, and decap problems increased proportionately as the latex dielectric constant was increased. The latex having the highest dielectric constant (3.12) failed to print at 3 kHz. Latexes having dielectric constant below 3.0 showed significant improvement in freqcel, decel and decap, with improvement appearing to be inversely proportional to latex dielectric constant. Those latexes having dielectric constant below 2.8 had an even better freqcel, decel and decap performance.

Example 3

Preparation of Core-Shell Latex Paticulates

A core-shell latex was synthesized using a seeded polymerization process. The core, in this case, was a copolymer of 63 wt % methyl methacrylate and 37 wt % hexyl acrylate, having a computed dielectric constant of 3.01. The shell was a copolymer of 53 wt % hexyl methacrylate, 6 wt % methyl methacrylate, and 1 wt % diethyleneglycol dimethacrylate, having a computed dielectric constant of 2.80. The shell was polymerized to encapsulate the core. The core to shell weight ratio was about 40:60. The resultant latex was then tested identically in accordance with Example 3. The freqcel, decel and decap results compared favorably to those latexes of roughly uniform copolymeric material having a bulk dielectric constant of 2.80 described in Example 2.

Example 4

Preparation of Latex Particulates Having Non-Reactive Surfactant Adsorbed Thereon About 102.5 g of methyl methacrylate, 120 g of hexyl acrylate, 25 g of mono-methacryloyloxyethyl succinate, 2.5 g of ethylene glycol dimethacrylate, and 1 g of isooctylthioglycolate were mixed together in an addition funnel to form a monomer mixture. About 85 g of water and 20.8 g of 30% RHODAFAC™ (non-reactive surfactant) surfactant were added to the monomer mixture and sheared gently to form an emulsion. At the same time, 725 ml of water were heated to 90° C. in a reactor. An initiator solution was separately prepared by dissolving 0.87 g of potassium persulfate in 100 ml of water. The initiator solution was added dropwise to the reactor at a rate of 3 ml/min with stirring. The monomer emulsion was simultaneously added dropwise to the reactor, starting 3 minutes after the start of initiator addition and over a period of 30 minutes. The reaction mixture was maintained at 90° C. for 2 hours with stirring following addition of the additives. The reaction mixture was allowed to cool to 50° C. at which time 23 g of 17.5% potassium hydroxide solution was added to bring the pH of the reaction mixture to 8.5. The resultant latex had a particle size of 230 nm.

Example 5

Preparation of Latex Particulates Having Reactive Surfactant Attached Thereto

About 102.5 g of methyl methacrylate, 120 g of hexyl acrylate, 25 g of mono-methacryloyloxyethyl succinate, 2.5 g of ethylene glycol dimethacrylate, and 1 g of isooctylthioglycolate were mixed together in an addition funnel to form a monomer mixture. About 105 g of water and 0.62 g of MAX-EMUL™ 6106 (reactive surfactant) were added to the monomer mixture and sheared gently to form an emulsion. At the same time, 725 ml of water were heated to 90° C. in a reactor. An initiator solution was separately prepared by dissolving 0.87 g of potassium persulfate in 100 ml of water. The initiator solution was added dropwise to the reactor at a rate of 3 ml/min with stirring. The monomer emulsion was simultaneously added dropwise to the reactor, starting 3 minutes after the start of initiator addition and over a period of 30 minutes. The reaction mixture was maintained at 90° C. for 2 hours with stirring following addition of the additives. The reaction mixture was allowed to cool to 50° C. at which time 23 g of 17.5% potassium hydroxide solution was added to bring the pH of the reaction mixture to 8.5. The resultant latex had a particle size of 320 nm.

Example 6

Preparation of Ultraviolet Absorber-Containing Latex Particulates Having Non-Reactive Surfactant Adsorbed Thereon About 102.5 g of methyl methacrylate, 117.5 g of hexyl acrylate, 2.5 g of ultraviolet absorber monomer Norbloc 7966, 25 g of mono-methacryloyloxyethyl succinate, 2.5 g of ethylene glycol dimethacrylate, and 1 g of isooctylthioglycolate were mixed together in an addition funnel to form a monomer mixture. About 85 g of water and 20.8 g of 30% RHODAFAC™ (non-reactive surfactant) surfactant were added to the monomer mixture and sheared gently to form an emulsion. At the same time, 725 ml of water were heated to 90° C. in a reactor. An initiator solution was separately prepared by dissolving 0.87 g of potassium persulfate in 100 ml of water. The initiator solution was added dropwise to the reactor at a rate of 3 ml/min with stirring. The monomer emulsion was simultaneously added dropwise to the reactor, starting 3 minutes after the start of initiator addition and over a period of 30 minutes. The reaction mixture was maintained at 90° C. for 2 hours with stirring following addition of the additives. The reaction mixture was allowed to cool to 50° C. at which time 23 g of 17.5% potassium hydroxide solution was added to bring the pH of the reaction mixture to 8.5. The resultant latex had a particle size of 230 nm.

Example 7

Preparation of Ink-Jettable Overcoat Composition

An ink-jettable coating composition was prepared by dispersing 5 wt % solids of the composition of Example 4 in a liquid vehicle. The liquid vehicle included 79 wt % water, 15 wt % organic cosolvent, 0.5 wt % vehicle surfactant, and 0.5 wt % biocide. The overcoat composition prepared provides good protection to both pigment-based and dye-based ink-jet inks printed on porous and other media.

Example 8

Preparation of Alternative Ink-Jettable Overcoat Composition

An ink-jettable coating composition was prepared by dispersing 5 wt % solids of the composition of Example 5 in a liquid vehicle. The liquid vehicle included 79 wt % water, 15 wt % organic cosolvent, 0.5 wt % vehicle surfactant, and 0.5 wt % biocide. The overcoat composition prepared was colorless and provides good protection to both pigment-based and dye-based ink-jet inks printed on porous and other media.

Example 9

Preparation of Ultraviolet Absorber-Containing Ink-Jettable Overcoat Composition An ink-jettable coating composition was prepared by dispersing 5 wt % solids of the composition of Example 6 in a liquid vehicle. The liquid vehicle included 79 wt % water, 15 wt % organic cosolvent, 0.5 wt % vehicle surfactant, and 0.5 wt % biocide. The overcoat composition prepared was colorless and provides good protection to both pigment-based and dye-based ink-jet inks printed on porous and other media.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A method for producing waterfast and humidifast images, comprising:
    (a) jetting an ink-jet ink including a colorant onto a media substrate; and
    (b) jetting a coating composition, devoid of colorant and including latex particulates dispersed in a liquid vehicle over the ink-jet ink previously jetted on the substrate, said latex particulates having a reactive surfactant covalently attached to a surface of the latex particulates.

2. A method as in claim 1, wherein the latex particulates have a surface dielectric constant from 2.0 to 3.0 at room temperature, and a bulk density from 0.90 g/cm$^3$ to 1.10 g/cm$^3$.

3. A method as in claim 1, wherein the latex particulates are present in the liquid vehicle at from 0.1 wt % to 20 wt % solids.

4. A method as in claim 1, wherein a crosslinking agent is polymerized in the latex particulates at from 0.1 wt % to 5 wt %, and wherein the latex particulates have a glass transition temperature from 0° C. to 50° C.

5. A method as in claim 1, wherein the media substrate is a porous media substrate.

6. A method for producing waterfast and humidifast images, comprising:
    (a) jetting an ink-jet ink including a colorant onto a media substrate; and
    (b) jetting a coating composition, devoid of colorant and including latex particulates dispersed in a liquid vehicle over the ink-jet ink previously jetted on the substrate, said latex particulates having a non-reactive surfactant adsorbed on a surface of the Latex particulates.

7. A method as in claim 6, wherein the latex particulates have a surface dielectric constant from 2.0 to 3.0 at room temperature, and a bulk density from 0.90 g/cm$^3$ to 1.10 g/cm$^3$.

8. A method as in claim 6, where the latex particulates are present in the liquid vehicle at from 0.1 wt % to 20 wt % solids.

9. A method as in claim 6, wherein a crosslinking agent is polymerized in the latex particulates at from 0.1 wt % to 5 wt %, and wherein the latex particulates have a glass transition temperature from 0° C. to 50° C.

10. A method as in claim 6, wherein the media substrate is a porous media substrate.

* * * * *

UNITED STATES PATENT AND TRADEMARK OFFICE
CERTIFICATE OF CORRECTION

PATENT NO. : 7,846,500 B2
APPLICATION NO. : 11/895868
DATED : December 7, 2010
INVENTOR(S) : Kent Vincent et al.

It is certified that error appears in the above-identified patent and that said Letters Patent is hereby corrected as shown below:

In column 19, line 12, in Claim 1, delete "humidifast" and insert -- humidfast --, therefor.

In column 20, line 5, in Claim 6, delete "humidifast" and insert -- humidfast --, therefor.

In column 20, line 14, in Claim 6, delete "Latex" and insert -- latex --, therefor.

Signed and Sealed this
Twenty-seventh Day of September, 2011

David J. Kappos
*Director of the United States Patent and Trademark Office*